No. 635,497. Patented Oct. 24, 1899.
T. E. MEADOWCROFT.
MAGAZINE CAMERA.
(Application filed July 12, 1899.)
(No Model.)
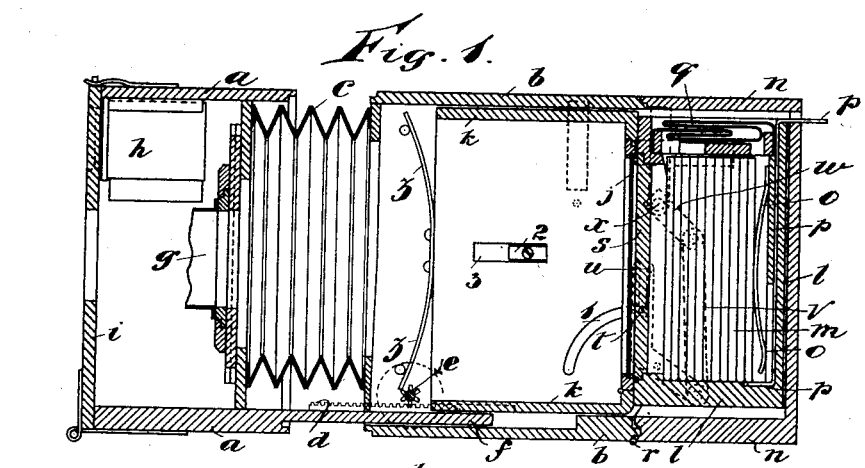
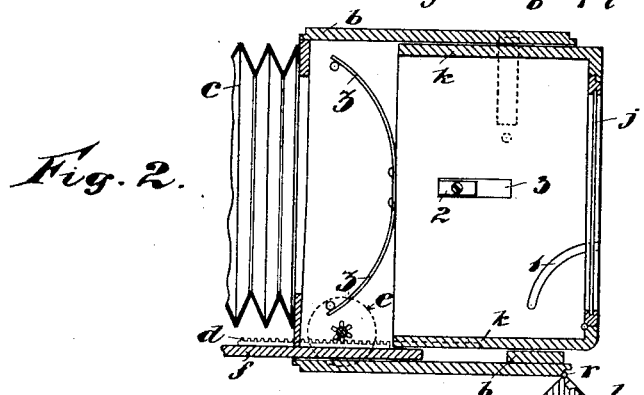
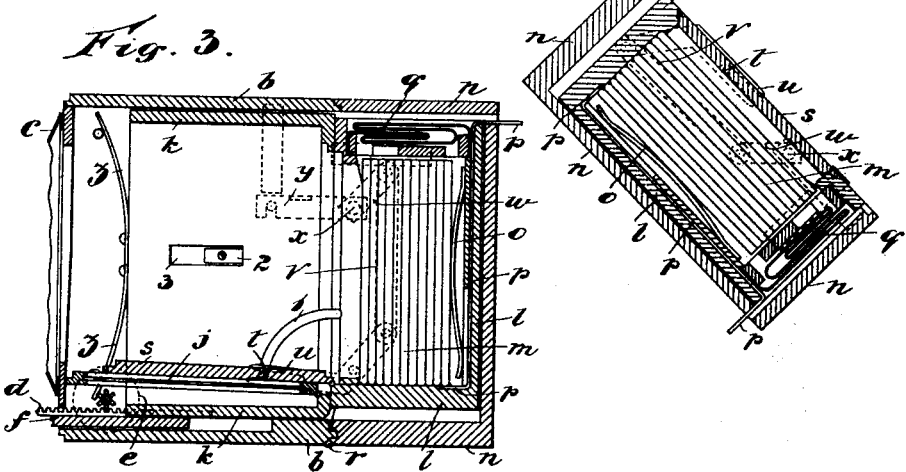
Witnesses
Inventor
Thomas Ernest Meadowcroft

UNITED STATES PATENT OFFICE.

THOMAS ERNEST MEADOWCROFT, OF LONDON, ENGLAND.

MAGAZINE-CAMERA.

SPECIFICATION forming part of Letters Patent No. 635,497, dated October 24, 1899.

Application filed July 12, 1899. Serial No. 723,523. (No model.)

*To all whom it may concern:*

Be it known that I, THOMAS ERNEST MEADOWCROFT, dealer in photographic apparatus, a subject of the Queen of Great Britain, residing at 233 Lavender Hill, London, England, have invented certain new and useful Improvements in Photographic Cameras, (for which I have applied for a patent in England on the 10th day of December, A. D. 1898, No. 26,140, and in Germany on the 15th day of April, A. D. 1899;) and I do hereby declare the following to be a full, clear, and exact description of the invention, such as will enable others skilled in the art to which it appertains to make and use the same.

This invention relates to improvements in that kind of photographic camera in which a number of sensitized plates or films are so stored in a magazine that they can be exposed one after the other without removing them from the camera, thus avoiding the necessity of employing a dark room until the whole of such plates or films have been exposed; and the object of this invention is to provide suitable and convenient means whereby such a camera may be focused for each successive picture to be taken.

In the accompanying drawings, Figure 1 illustrates in longitudinal vertical section a camera constructed in accordance with my invention, the parts being shown in their normal position, except that the front part of the camera is partly drawn out, as in the focusing operation. Fig. 2 is a similar section of the rear part of the camera in the focusing position, and Fig. 3 is a similar section of the same part of the camera in the position for taking the picture.

Similar letters relate to like parts in all the figures of the drawings.

The front part of the camera is divided into two compartments $a$ and $b$, connected by a bellows $c$ or other device capable of being expanded or contracted at will by means of racks $d$ and pinions operated, for example, by a milled head $e$ on the exterior of the camera in a manner well understood in connection with such apparatus. The compartments $a$ and $b$ can be maintained parallel to one another by one or more suitable guide-plates $f$ or by rods, bars, or the like.

Suitable finders—as $h$, for example, Fig. 1—shutter, stops, and other parts incidental to cameras of this class are provided; but I have not considered it necessary to illustrate these in the drawings.

The front $i$, Fig. 1, of the camera is hinged to the camera-body in the usual manner.

$j$ is the focusing-screen, hinged to one side of a yielding spring-frame $k$, which is so mounted in the rear part $b$ of the camera-body that when in the focusing position the focusing-screen is held in the plane which will afterward be occupied by the sensitized plate or film in the magazine while the picture is being taken.

B is a stud or projection on the inside of the camera-body taking into a slot or guideway C in the side of the yielding frame $k$ and by which the said frame is guided and kept in place.

Z are springs acting to force the frame $k$ toward the rear of the camera.

The magazine containing the sensitized plates or films may be of any convenient known form; but I prefer that in which the plates or films are transferred by hand from back to front of the magazine, or vice versa, by the aid of a flexible bag or hood—such, for example, as is shown in the drawings—$l$ being the magazine containing the plates or films $m$ and fitted into the rearmost part $n$ of the camera. The plates $m$ are preferably mounted in the usual holders and are kept pressed forward in place by the springs $o$.

$p$ is a Z-shaped bar by which the hindermost of the plates may be raised to such a height above the others that it may be grasped by the fingers of the operator acting through the light-tight flexible bag $q$ and transferred to the front position in a manner well understood and to which I make no general claim.

The part $n$ of the camera, which contains the magazine $i$, is hinged at $r$ to the back part of the camera-body and is closed light-tight on that side by a hinged door or shutter $s$, which can be opened or closed from the exterior of the camera by means of a lever or other suitable device. For example, I sometimes provide a pin $t$, projecting from one side of the hinged door or shutter $s$, which pin engages with a slotted crank-arm $u$, which may be connected by a link $v$ to a second crank-arm $w$, the axis $x$ of which passes through the side of the camera, as shown, and is actuated by a lever or other suitable device $y$, Fig 3, conveniently situated on the exterior of the camera.

During the focusing operation the rearmost part $n$ of the camera, containing the magazine $l$, is turned on its hinge $r$ out of the way of the focusing-screen $j$, as shown in Fig. 2; but when it is desired to take the picture the said part $n$ and magazine $l$ are closed against the back end of the camera-body, containing the yielding frame $k$ of the focusing-screen $j$, which frame $k$ is thereby forced inward against the resistance of the springs $z$ until the foremost of the sensitized plates $m$, which is, however, covered by the hinged door or shutter $s$ of the magazine $l$, is in the focusing-plane—that is to say, in the position shown in Fig. 1. The hinged door or shutter $s$ may now be opened by means of the lever $y$ or other device on the exterior of the camera, the pin $t$ passing into and traversing a segmental slot $A$ in the side of the yielding frame $k$ of the focusing-screen $j$ and in opening the said door or shutter $s$ comes into contact with the hinged focusing-screen $j$, and not only causes the said screen to open, but also serves to mask the glass surface thereof while in the open position, as seen clearly in Fig. 3. After the picture is taken the hinged door or shutter $s$ of the magazine $l$ is closed by means of the lever $y$ or other device, and the focusing-screen $j$ is returned into its normal position by means of a spring or otherwise. The rearmost part $n$ of the camera and the magazine $l$ may now be turned back on the hinge $r$ out of the way, as in Fig. 2, when the yielding frame $k$ will be forced outward by means of the springs $z$ into the focusing-plane, and the cycle of operations can then be repeated.

I claim—

1. In photographic cameras, the combination with the camera-box, of a hinged focusing-screen, a magazine hinged to said camera-box, and means whereby the movement of the magazine away from and toward the camera-box will automatically bring said screen into and out of focusing position, substantially as described.

2. In photographic cameras the combination of the yielding frame $k$, hinged focusing-screen $j$, magazine $l$, hinged door or shutter $s$, and actuating devices $t$, $u$, $v$, $w$, $x$, and $y$ with the plate-changing devices $p$, $q$, substantially as described.

3. In photographic cameras the combination of the yielding frame $k$, hinged focusing-screen $j$, magazine $l$, hinged door or shutter $s$, and actuating devices $t$, $u$, $v$, $w$, $x$ and $y$ with the bellows or other focusing devices $c$ and plate-changing devices $p$, $q$, substantially as described.

4. The new or improved photographic camera which consists of a front part divided into two but flexibly connected, a yielding frame carrying a removable focusing-screen, a magazine with hinged door or shutter, means for changing the position of the plates or films, and devices for focusing, removing focusing-screen, and exposing the sensitized plate or film, combined, arranged, and operating substantially as described.

In witness whereof I have hereunto set my hand in presence of two witnesses.

THOMAS ERNEST MEADOWCROFT.

Witnesses:
JOHN ROBERT CLAYTON CHANCE.
STEPHEN EDWARD GUNYON.